(12) United States Patent
Iriyama et al.

(10) Patent No.: US 10,833,364 B2
(45) Date of Patent: Nov. 10, 2020

(54) LITHIUM-ION SECONDARY BATTERY

(71) Applicant: NEC CORPORATION, Tokyo (JP)

(72) Inventors: Jiro Iriyama, Tokyo (JP); Kenichi Shimura, Tokyo (JP); Kazuhiko Inoue, Tokyo (JP)

(73) Assignee: NEC CORPORATION, Tokyo (JP)

( * ) Notice: Subject to any disclaimer, the term of this patent is extended or adjusted under 35 U.S.C. 154(b) by 148 days.

(21) Appl. No.: 15/572,568

(22) PCT Filed: May 9, 2016

(86) PCT No.: PCT/JP2016/063719
§ 371 (c)(1),
(2) Date: Nov. 8, 2017

(87) PCT Pub. No.: WO2016/181926
PCT Pub. Date: Nov. 17, 2016

(65) Prior Publication Data
US 2018/0175449 A1 Jun. 21, 2018

(30) Foreign Application Priority Data
May 11, 2015 (JP) ................. 2015-096933

(51) Int. Cl.
H01M 2/16 (2006.01)
H01M 10/0567 (2010.01)
H01M 4/525 (2010.01)
H01M 4/131 (2010.01)
H01M 10/058 (2010.01)
H01M 10/0525 (2010.01)

(52) U.S. Cl.
CPC ....... H01M 10/0567 (2013.01); H01M 2/162 (2013.01); H01M 2/1653 (2013.01); H01M 2/1686 (2013.01); H01M 4/131 (2013.01); H01M 4/525 (2013.01); H01M 10/058 (2013.01); H01M 10/0525 (2013.01); H01M 2220/20 (2013.01); H01M 2300/0005 (2013.01); H01M 2300/0025 (2013.01); Y02E 60/122 (2013.01)

(58) Field of Classification Search
CPC ......... H01M 10/0567; H01M 10/0525; H01M 10/058; H01M 2/162; H01M 2/1653; H01M 2/1686; H01M 4/131; H01M 4/525; H01M 2220/20; H01M 2300/0005; H01M 2300/0025; Y02E 60/122
See application file for complete search history.

(56) References Cited

U.S. PATENT DOCUMENTS 5,296,319 A 3/1994 Bito et al.
6,489,062 B1 * 12/2002 Watanabe ........... H01M 2/0413
429/231.1
2008/0193834 A1 * 8/2008 Murakami ............ H01M 2/166
429/129
2009/0142663 A1 6/2009 Takeuchi et al.
2009/0317718 A1 12/2009 Imachi et al.
2010/0190054 A1 7/2010 Odani et al.
2011/0183212 A1 * 7/2011 Takahashi ............ H01M 4/621
429/300
2011/0318631 A1 12/2011 Nomura et al.
2014/0248529 A1 * 9/2014 Chen ..................... C01G 53/54
429/163
2016/0056469 A1 * 2/2016 Kawakita ............ H01M 10/052
429/209

FOREIGN PATENT DOCUMENTS

| JP | 04-355065 A | 12/1992 | |
|---|---|---|---|
| JP | 11-250890 A | 9/1999 | |
| JP | 2000-191823 A | 7/2000 | |
| JP | 2000-353525 A | 12/2000 | |
| JP | 2001-148242 A | 5/2001 | |
| JP | 2007-053083 A | 3/2007 | |
| JP | 2008-027766 A | 2/2008 | |
| JP | 2008-198432 A | 8/2008 | |
| JP | 2009-064564 A | 3/2009 | |
| JP | 2009-151959 A | 7/2009 | |
| JP | 2013-511124 A | 3/2013 | |
| JP | 2014-063676 A | 4/2014 | |
| WO | WO 2014/156116 | * 10/2014 | .............. H01M 4/62 |

OTHER PUBLICATIONS

Communication dated Nov. 7, 2018, issued by the European Patent Office in corresponding European Application No. 16792651.8.
International Search Report for PCT/JP2016/063719 dated Jul. 5, 2016 [PCT/ISA/210].
Written Opinion for PCT/JP2016/063719 dated Jul. 5, 2016 [PCT/ISA/237].
Communication dated Jun. 2, 2020, from the Japanese Patent Office in Application No. 2017-517926.

* cited by examiner

Primary Examiner — Raymond Alejandro
(74) Attorney, Agent, or Firm — Sughrue Mion, PLLC

(57) ABSTRACT

Lithium ion secondary batteries are disclosed that include a positive electrode comprising a lithium nickel composite oxide as a positive electrode active material and a separator consisting of one or more layers selected from polyimide layer, polyamide layer, the battery having a low self-discharge failure rate even after long term storage. The lithium ion secondary batteries can include a positive electrode comprising a lithium nickel composite oxide and a separator consisting of one or more layers selected from polyimide layer, polyamide layer, and polyamide imide layer, wherein the battery comprises an acid and/or an acid anhydride in an electrolyte solution and/or a member in contact with the electrolyte solution.

13 Claims, 1 Drawing Sheet

LITHIUM-ION SECONDARY BATTERY

CROSS REFERENCE TO RELATED APPLICATION

This application is a National Stage of International Application No. PCT/JP2016/063719 filed May 9, 2016, claiming priority based on Japanese Patent Application No. 2015-096933 filed May 11, 2015, the contents of all of which are incorporated herein by reference in their entirety.

TECHNICAL FIELD

The present invention relates to a lithium ion secondary battery, a method for manufacturing the same, and a vehicle and power storage equipment using a lithium ion secondary battery.

BACKGROUND ART

Lithium ion secondary batteries are characterized by their small size and large capacity and are widely used as power sources for electronic devices such as mobile phones and notebook computers, and have contributed to the improvement of the convenience of portable IT devices. In recent years, attention has also been drawn to the use in large-sized applications such as drive power supplies for motorcycles and automobiles, and storage batteries for smart grids. As the demand for lithium ion secondary batteries has increased and they are used in various fields, batteries have been required to have characteristics, such as further higher energy density, lifetime characteristics that can withstand long-term use, and usability under a wide range of temperature conditions.

It is preferable to use a compound having high discharge capacity for a positive electrode active material in order to increase energy density and capacity of batteries. In recent years, lithium nickel composite oxides in which a part of the Ni of lithium nickelate ($LiNiO_2$) is replaced by another metal element are often used as the compound having high capacity. In particular, a compound in which the content of Ni is high has high capacity and is particularly preferred. Patent Document 1 discloses that a lithium ion secondary batteries having high capacity and excellent cycle characteristics can be provided by using a positive electrode in which a positive electrode active material is a lithium nickel composite oxide having a high Ni content and a negative electrode formed by using a carbon material as a negative electrode active material and an aqueous polymer as a binder.

On the other hand, the inside of batteries having high energy density tends to become hot when self-discharge failure is generated due to internal short circuit because the heat generation is large and thereby the speed of the temperature rise is fast. In the case of using separator with low heat resistance, since it comprises a material having a high thermal shrinkage and a low melting point, the separator deforms or melts at a high temperature and the function of the separator cannot be maintained. At this time, further short circuit is generated and triggers serious accidents such as ignition and explosion. In order to avoid such a risk, heat resistant separators using polyamide or polyimide with a high heat resistant temperature have been developed. For example, Patent Document 2 discloses a porous polymer film for a battery separator made of polyamide or polyimide and having a specific pore size, porosity, and thickness. Patent Document 3 discloses a wholly aromatic polyamide microporous film excellent in thermal resistance and mechanical strength and suitable for a battery separator.

CITATION LIST

Patent Document

Patent Document 1: Japanese Patent Laid-Open No. 2000-353525

Patent Document 2: Japanese Patent Laid-Open No. H11-250890

Patent Document 3: Japanese Patent Laid-Open No. 2000-191823

SUMMARY OF INVENTION

Technical Problem

A lithium nickel composite oxide contains alkaline substances as impurities, used as starting materials for its synthesis, such as lithium hydroxide, lithium carbonate, and lithium hydrogen carbonate. After a battery is assembled, these alkaline substances are eluted into the electrolyte solution from the positive electrode to make the electrolyte solution alkaline. However, the separator made of polyimide, polyamide, or polyamide imide, such as those described in Patent Documents 2 and 3, has low alkali resistance, and thereby after a long period in an alkaline solution, the strength, elongation and elastic modulus of the separator are lowered and self-discharge failure is generated in the battery. For this reason, although a separator comprising polyimide, polyamide or polyamide imide as a main material is excellent in high energy density, there is a problem in that it is not suitable for a lithium ion secondary battery using a lithium nickel composite oxide as a positive electrode active material in order to increase the capacity.

An object of the present invention is to decrease the above problem of generation of self-discharge failure in the lithium ion secondary battery having a separator consisting of one or more layers selected from polyimide layer, polyamide layer and polyamide imide layer and using a lithium nickel composite oxide as a positive electrode active material.

Solution to Problem

The present invention relates to a lithium ion secondary battery comprising a positive electrode comprising a lithium nickel composite oxide and a separator consisting of one or more layers selected from polyimide layer, polyamide layer, and polyamide imide layer, wherein the battery comprises an acid and/or an acid anhydride in an electrolyte solution and/or a member in contact with the electrolyte solution.

Advantageous Effect of Invention

According to the present invention, there can be provided a lithium ion secondary battery comprising a positive electrode comprising a lithium nickel composite oxide as a positive electrode active material and a separator consisting of one or more layers selected from polyimide layer, polyamide layer, the battery having a low self-discharge failure rate even after long term storage.

DESCRIPTION OF EMBODIMENTS

Figure 1:
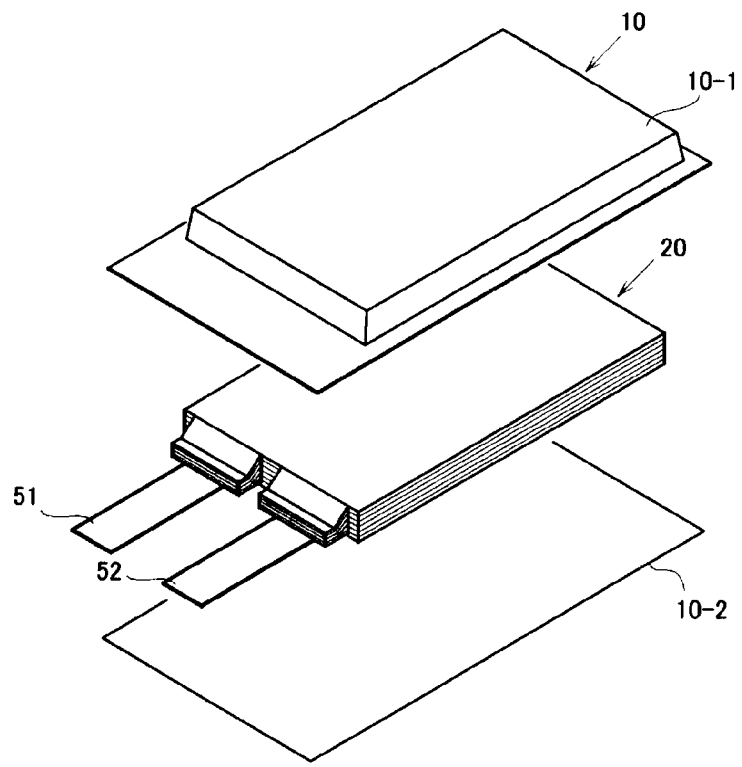
FIG. 1 is an exploded perspective view showing a basic structure of a film package battery.

In the present invention, the positive electrode active material comprises a lithium nickel composite oxide. A positive electrode containing a lithium nickel composite oxide comprises lithium hydroxide, lithium carbonate and lithium hydrogen carbonate that are alkaline as impurities. In the present invention, the electrolyte solution and/or the member in contact with the electrolyte solution comprises an acid and/or an acid anhydride. Thereby, an increase in alkalinity of the electrolytic solution can be prevented, even if lithium hydroxide, lithium carbonate and lithium hydrogen carbonate are eluted from the positive electrode into the electrolyte solution during using the battery. Even if the lithium nickel composite oxide is washed with water in advance, it may be difficult to remove lithium hydroxide, lithium carbonate and lithium hydrogen carbonate contained inside a positive electrode mixture layer. For this reason, lithium hydroxide, lithium carbonate and lithium hydrogen carbonate may be eluted from the inside of the particle into the electrolyte solution due to a crack of the positive electrode active material particles during using the battery. Even in such a case, the present invention can prevent deterioration of the separator made of polyimide, polyamide, or polyamide imide due to lithium hydroxide, lithium carbonate and lithium hydrogen carbonate. In particular, the present invention may be more effective when the packing density of the positive electrode is increased because the positive electrode active material particles are cracked easily and alkaline substances are liable to be eluted into the electrolytic solution.

In the present invention, an acid and/or an acid anhydride are contained in the electrolyte solution and/or the member in contact with the electrolyte solution. The acid and/or the acid anhydride are preferably contained in the electrolyte solution but may be contained in a member configuring the battery, such as an electrode mixture layer. Since the acid and/or the acid anhydride tend to contact with the alkaline components contained in the electrolyte solution when the electrolyte solution comprises the acid and/or the acid anhydride, it is possible to surely prevent the deterioration of the separator due to the alkaline components generated by a crack of the active material particles in a press process after electrode coating or a crack of the active material particles during using the battery, which is preferable. However, if the acid and/or the acid anhydride are contained at least in a member in contact with the electrolytic solution, they can react with hydroxyl ions, carbonate ions and hydrogen carbonate ions derived from lithium hydroxide, lithium carbonate and lithium hydrogen carbonate dissolved in the electrolytic solution to reduce their concentrations. It is preferable that the acid and the acid anhydride to be used are suitable for a member to be added, and those conventionally used for members of batteries may be appropriately selected.

The acid to be added only needs to neutralize lithium hydroxide, lithium carbonate and/or lithium hydrogen carbonate in the electrolyte solution under normal temperature and normal pressure to form a lithium salt and water which are low in basicity and stable in the electrolyte solution. Examples thereof include carbonic acid and compounds having carboxylic acid group, sulfonic acid group, or phosphoric acid group, which show acidity in an aqueous solution.

The acid anhydride to be added only needs to react with lithium hydroxide, lithium carbonate and/or lithium hydrogen carbonate in the electrolyte solution under normal temperature and normal pressure to form a lithium salt and a compound which are low in basicity and stable in the electrolyte solution. Examples thereof include those obtained by dehydration condensation of one or more acids selected from carboxylic acid group, sulfonic acid group and phosphoric acid group.

Configurations of the lithium ion secondary battery according to the present invention will be described below. Suitable acids and/or acid anhydrides to be added to each member will be also described together with members suitable for the present invention.

(Separator)

The separator is installed in the battery cell for the purpose of a function of transmitting charged substances while preventing contact between the electrodes of the battery.

In the present invention, the separator consists of one or more layers selected from polyimide layer, polyamide layer, and polyamide imide layer. The separator made of polyimide, polyamide, or polyamide imide has thermal resistance and can enhance safety of a battery having high energy density due to its high melting point and low thermal shrinkage but it has low alkali resistance, and when it is used under an alkaline condition, the strength, elongation and elastic modulus are lowered to generate self-discharge failure in the battery. In the present invention, the self-discharge failure can be improved by reducing the alkaline substances, contained in the lithium nickel composite oxide, inside the battery.

The polyimide contained in the separator is not particularly limited as long as it is a polymer having an imide bond in a repeating unite but it is preferably an aromatic polyimide in which aromatic compounds are connected with an imide bond directly. Examples of the aromatic polyimide include those obtained by polymerizing pyromellitic dianhydride and 4,4'-diaminodiphenyl ether.

The polyamide contained in the separator is not particularly limited as long as it is a polymer having an amide bond in a repeating unit. It may be a random polymer in the case of a polymer in which a plurality of kinds of monomer unites is co-polymerized. In addition, it may be a polymer containing a polyamide as a block polymer. A homopolymeric polyamide is preferred.

The polyamide may be either an aliphatic polyamide or aromatic polyamide. Among them, the aromatic polyamide is preferred. Since the polyamide comprising an aromatic group has high thermal resistance and mechanical strength, it is suitable for the separator of the battery with high energy density, using the lithium nickel composite oxide in the positive electrode. In particular, wholly aromatic polyamide, i.e. so-called aramid, in which one or more, for example two or three aromatic groups are polymerized through amide bonds is preferred. Examples of the aromatic group of the aramid include phenylene group, and it may be a group in which two aromatic rings are bonded through oxygen, sulfur or an alkylene group such as methylene group, ethylene group or propylene group. These aromatic groups may have a substituent and examples of the substituent include alkyl groups such as methyl group, ethyl group and propyl group, alkoxy groups such as methoxy group, ethoxy group and propoxy group, halogens such as chloro group. In particular, these in which a part or all of hydrogen atoms on a non-substituted aromatic ring are substituted with halogen groups such as fluorine, bromine, and chlorine are preferred because they have high oxidation resistance and does not deteriorate by oxidation. The aramid used in the present invention may be either para type or meta type.

Examples of the aramid which can be preferably used in the present embodiment include polymetaphenylene isophthalamide, polyparaphenylene terephthalamide, copolyparaphenylene 3,4'-oxydiphenylene terephthalamide and those in which hydrogen(s) on the phenylene group of these is substituted.

The polyamide imide contained in the separator only needs to be a polymer having an imide bond and an amide bond in a repeating unit.

At least one polymer selected from polyimide, polyamide, and polyamide imide is a main material of the separator and can provide thermal resistance to the separator. The polyimide, polyamide, and polyamide imide are preferably contained in an amount of 70 mass % or more, more preferably 90 mass % or more, of the separator. In addition to polyimide, polyamide and polyamide imide which are main materials, the separator may contain additives such as metal salts and resins in order to improve the mechanical strength and workability of the separator.

The separator may have single layer structure or laminated structure but in the case of the laminated structure, each layer is polyimide layer, polyamide layer or polyamide imide layer. A main material of each layer of the laminated structure is polyimide, polyamide, or polyamide imide and the content thereof is preferably 70 mass % or more, more preferably 90 mass % or more of each layer. The present invention can prevent heat shrinkage of the separator by using the separator consisting of one or more layers selected from polyimide layer, polyamide layer, and polyamide imide layer, even if the heat generation occurs due to short circuit. In contrast, if the separator has a laminated structure of a layer using materials such as polypropylene having low thermal resistance for a main material and a polyimide layer, polyamide layer or polyamide imide layer, the polyimide layer, polyamide layer, or polyamide imide layer does not have rigidity capable of withstanding thermal shrinkage of the layer having low thermal resistance and shrinks by following the heat shrinkage of the layer having low thermal resistance.

Form of the separator is not particularly limited as long as it has the function of a separator but a microporous membrane or a nonwoven fabric is preferable. In particular, since the pore diameter can be easily reduced, a microporous membrane is advantageous from the viewpoint of preventing short circuit and thereby more preferable. As described above, the microporous membrane may be either a single layer or lamination layer as long as each layer constituting the separator is polyamide layer, polyimide layer, or polyamide imide layer. For example, a single layer polyimide microporous membrane, a single layer polyamide microporous membrane, a single layer polyamide imide microporous membrane and a laminated polyimide/polyamide microporous membrane can be used for the microporous membrane. In addition, different forms may be adopted for each layer. For example, a separator configured by laminating a polyimide nonwoven fabric or polyamide nonwoven fabric and a polyimide microporous membrane or polyamide microporous membrane may be used.

The porosity of the microporous membrane and the nonwoven fabric used for the separator may be appropriately set according to properties of the lithium ion secondary battery, but in order to obtain excellent rate characteristics of the battery, the porosity of the separator is preferably 40% or more, and more preferably 50% or more. In addition, in order to increase the strength of the separator, the porosity of the separator is preferably 90% or less, and more preferably 80% or less. The porosity of the separator can be calculated as follows by measuring bulk density in accordance with JIS P 8118:

Porosity (%)=[1−(bulk density ρ (g/cm$^3$)/theoretical density ρ$_0$ of the material (g/cm$^3$))]×100.

Other measurement methods include a direct observation method using an electron microscope and a press fitting method using a mercury porosimeter.

The pore size of the separator may be appropriately set according to properties of the lithium ion secondary battery. Small pore size is more advantageous for preventing short circuit when lithium is precipitated on the electrode by abnormal charge or discharge. The pore size of the microporous membrane and the nonwoven fabric is preferably 1 μm or less, more preferably 0.5 μm or less, and still more preferably 0.1 μm or less. In addition, the pore size of the microporous membrane and the nonwoven fabric is preferably 0.005 μm or more, and more preferably 0.01 μm or more in order to transmit charged substances.

The thickness of the separator may be appropriately set according to properties of the lithium ion secondary battery. For example, it may be 3 μm or more in order to impart properties such as short circuit prevention and heat resistance, and is preferably 5 μm or more, and more preferably 8 μm or more. In order to meet specifications of batteries such as normally required energy density, the thickness may be 40 μm or less, preferably 30 μm or less, and more preferably 25 μm or less.

(Positive Electrode)

The positive electrode has a structure in which a positive electrode mixture layer comprising a positive electrode active material capable of reversibly absorbing and desorbing lithium ions with charge and discharge and a binder is laminated on a current collector.

In the present invention, the positive electrode comprises a lithium transition metal composite oxide, especially, a lithium nickel composite oxide. The lithium nickel composite oxide to be used in the present invention is not particularly limited but it is preferably a positive electrode material with high energy density in order to exhibit the characteristics of the separator with thermal resistance containing one or more polymers selected from polyimide, polyamide and polyamide imide as a main material. More specifically, lithium nickel composite oxides having a layered structure or a spinel structure can be mentioned and they will be explained in more detail below.

Examples of the material having a layered structure include lithium nickel composite oxides represented by the following formula (A), $$Li_yNi_{(1-x)}M_xO_2 \quad (A)$$

wherein 0≤x<1, 0<y≤1.2, and M is at least one element selected from the group consisting of Co, Al, Mn, Fe, Ti, and B.

It is preferred that the compound represented by the formula (A) have high Ni content, that is, x is less than 0.5, further preferably 0.4 or less in the formula (A). Examples of such compounds include $Li_\alpha Ni_\beta Co_\gamma Mn_\delta O_2$ (0<α≤1.2, β+γ+δ=1, β≥0.7, and γ≤0.2) and $Li_\alpha Ni_\beta Co_\gamma Al_\delta O_2$ (0<α≤1.2, β+γ+δ=1, β 0≥0.7, and γ≤0.2) and particularly include $LiNi_\beta Co_\gamma Mn_\delta O_2$ (0.75≤β≤0.85, 0.05≤γ≤0.15, and 0.10≤δ≤0.20). More specifically, for example, $LiNi_{0.8}Co_{0.05}Mn_{0.15}O_2$, $LiNi_{0.8}Co_{0.1}Mn_{0.1}O_2$, $LiNi_{0.8}Co_{0.15}Al_{0.05}O_2$, and $LiNi_{0.8}Co_{0.1}Al_{0.1}O_2$ may be preferably used.

From the viewpoint of thermal stability, it is also preferred that the content of Ni does not exceed 0.5, that is, x is 0.5 or more in the formula (A). In addition, it is also preferred that particular transition metals do not exceed half. Examples of such compounds include $Li_\alpha Ni_\beta Co_\gamma Mn_\delta O_2$ ($0<\alpha\leq1.2$, $\beta+\gamma+\delta=1$, $0.2\leq\beta\leq0.5$, $0.1\gamma\leq0.4$, and $0.1\leq\delta\leq0.4$). More specific examples may include $LiNi_{0.4}Co_{0.3}Mn_{0.3}O_2$ (abbreviated as NCM433), $LiNi_{1/3}Co_{1/3}Mn_{1/3}O_2$, $LiNi_{0.5}Co_{0.2}Mn_{0.3}O_2$ (abbreviated as NCM523), and $LiNi_{0.5}Co_{0.3}Mn_{0.2}O_2$ (abbreviated as NCM532) (also including those in which the content of each transition metal fluctuates by about 10% in these compounds).

In addition, two or more compounds represented by the formula (A) may be mixed and used, and, for example, it is also preferred that NCM532 or NCM523 and NCM433 are mixed in the range of 9:1 to 1:9 (as a typical example, 2:1) and used. Further, by mixing a material in which the content of Ni is high (x is 0.4 or less in the formula (A)) and a material in which the content of Ni does not exceed 0.5 (x is 0.5 or more, for example, NCM433), a battery having high capacity and high thermal stability can also be formed.

Examples of the lithium nickel composite oxide having a spinel structure include lithium nickel composite oxides represented by the following formula (B),

$$Li_a(M_x Mn_{2-x-y} Y_y)(O_{4-w} Z_w) \quad (B)$$

wherein $0\leq x\leq1.2$, $0\leq y$, $x+y<2$, $0<a\leq1.2$, $0\leq w\leq1$, M comprises Ni and may further comprise at least one selected from Co, Fe, Cr, and Cu, Y is at least one selected from Li, B, Na, Al, Mg, Ti, Si, K and Ca, Z is at least one of F and Cl.

Examples of the material represented by the formula (B) include $LiNi_{0.5}Mn_{1.5}O_4$ and the like.

Two or more of the lithium nickel composite oxides may be mixed and used. The lithium nickel composite oxide is a positive electrode active material with high energy density, and therefore, it is preferable to the lithium ion secondary battery of the present invention that the lithium nickel composite oxide is more contained in the positive electrode in order to increase the energy density. The content of the lithium nickel composite oxide is preferably 25 mass % or more, more preferably 50% mass or more in all of the used positive electrode active materials, and may be 100 mass %.

Examples of the positive electrode binder include polyvinylidene fluoride, vinylidene fluoride-hexafluoropropylene copolymer, vinylidene fluoride-tetrafluoroethylene copolymer, polytetrafluoroethylene, polypropylene, polyethylene, polyimide, polyamideimide and the like. In addition to the above, styrene butadiene rubber (SBR) and the like can be used. When an aqueous binder such as an SBR emulsion is used, a thickener such as carboxymethyl cellulose (CMC) can also be used. Among them, from the viewpoint of versatility and low cost, polyvinylidene fluoride and polytetrafluoroethylene are preferred and polyvinylidene fluoride is more preferred. The amount of the positive electrode binder is preferably 2 to 10 parts by mass based on 100 parts by mass of the positive electrode active material, from the viewpoint of sufficient binding strength and high energy density being in a trade-off relation with each other.

In one aspect of the present embodiment, the acid and/or the acid anhydride may be added to the positive electrode mixture layer. Examples of the acid especially include compounds having a functional group such as carboxylic acid group, sulfonic acid group, or phosphoric acid group. Examples of the acid anhydride include carboxylic anhydrides, particularly succinic anhydride, tetrafluorosuccinic anhydride, maleic anhydride.

A polymer bearing an acid and/or an acid anhydride may be added to the positive electrode mixture layer. The acidic group such as carboxylic acid group, sulfonic acid group, or phosphoric acid group may be bonded with the polymer acting as a positive electrode binder. Examples of monomer unit with an acidic group include acrylic acids, methacrylic acids and the like. The binder having an acidic group may be obtained by polymerizing them alone or copolymerizing them with another polymerizable monomer. Such a binder having an acidic group is publicly known and for example, is described in Japanese Patent Laid-Open No. 2011-192644 and No. 2014-165108.

The content of the acid additive is preferably 2 to 10 parts by mass, more preferably 3 to 6 parts by mass based on 100 parts by mass of the positive electrode active material in the same way as the binder. By controlling the content of the additive, the concentration of hydroxyl ions in the electrolyte solution can be reduced and the energy density of the positive electrode can be maintained within a required range.

A conductive assisting agent may be added into the positive electrode mixture layer comprising the positive electrode active material for the purpose of lowering the impedance. Examples of the conductive assisting agent include flake-like, soot, and fibrous carbon fine particles and the like, for example, graphite, carbon black, acetylene black, vapor grown carbon fibers (for example, VGCF manufactured by Showa Denko) and the like.

The packing density of the positive electrode mixture layer comprising the positive electrode active material and the binder can be increased by pressing the positive electrode. As described above, when the packing density of the positive electrode is increased, there is concern over the generation of lithium hydroxide, lithium carbonate and lithium hydrogen carbonate during using the battery. However, in the present invention, the concentration of hydroxyl ions in the electrolyte solution comprising lithium hydroxide, lithium carbonate and lithium hydrogen carbonate can be decreased inside the battery, and it is possible to more advantageously increase the energy density of the battery. The positive electrode mixture layer preferably has a packing density of 3.0 g/cm$^3$ or more, more preferably 3.1 g/cm$^3$ or more, still more preferably 3.2 g/cm$^3$ or more. On the other hand, when the packing density is high, the electrolyte solution cannot permeate the mixture layer because the voids are reduced. Therefore, the positive electrode mixture has preferably a packing density of 3.6 g/cm$^3$ or less.

As the positive electrode current collector, a current collector using aluminum, an aluminum alloy, or iron-nickel-chromium-molybdenum based stainless steel is preferable.

(Negative Electrode)

The negative electrode has a structure in which a negative electrode mixture layer comprising a negative electrode active material and a binder is laminated on a current collector. The negative electrode active material is a substance capable of reversibly absorbing and desorbing lithium ions with charge and discharge. Examples of the negative electrode active material used in the present invention include, but not particularly limited to, metals, metal oxides, and carbon materials.

Examples of the metal include Li, Al, Si, Pb, Sn, In, Bi, Ag, Ba, Ca, Hg, Pd, Pt, Te, Zn, La, and alloys of two or more of these. Also, these metals or alloys may be used as a mixture of two or more. Also, these metals or alloys may contain one or more non-metal elements.

Examples of the metal oxide include silicon oxide, aluminum oxide, tin oxide, indium oxide, zinc oxide, lithium oxide, and composites of these. In the present embodiment, tin oxide or silicon oxide is preferably contained as a negative electrode active material, and silicon oxide is more preferably contained. This is because silicon oxide is relatively stable and is unlikely to trigger a reaction with other compounds. Also, for example, 0.1 to 5 mass % of one or two or more elements selected from nitrogen, boron, and sulfur can be added to the metal oxide. In this way, the electroconductivity of the metal oxide can be enhanced.

Examples of the carbon materials include graphite, amorphous carbon, diamond-like carbon, carbon nanotube, and composites thereof. Here, highly crystalline graphite is highly electroconductive, and has excellent adhesion to a negative electrode current collector composed of a metal such as copper as well as voltage flatness. On the other hand, low-crystallinity amorphous carbon shows relatively small volume expansion, is thus highly effective in lessening the volume expansion of the entire negative electrode, and is unlikely to undergo degradation resulting from non-uniformity such as grain boundaries and defects.

Also, for the negative electrode active material, not a single material but a plurality of materials as a mixture can be used. For example, the same kind of materials such as graphite and amorphous carbon may be mixed, and different kinds of materials such as graphite and silicon may be mixed. It is possible to increase the energy density and improve the cycle characteristics by using a plurality of materials as a mixture.

The negative electrode binder is not particularly limited, and, for example, polyvinylidene fluoride, vinylidene fluoride-hexafluoropropylene copolymer, vinylidene fluoride-tetrafluoroethylene copolymer, polytetrafluoroethylene, polypropylene, polyethylene, acrylic, polyimide, polyamide imide, and the like can be used. In addition to the above, styrene butadiene rubber (SBR) and the like can be used. When an aqueous binder such as an SBR emulsion is used, a thickener such as carboxymethyl cellulose (CMC) can also be used. The amount of the negative electrode binder used is preferably 0.5 to 20 parts by mass based on 100 parts by mass of the negative electrode active material from the viewpoint of sufficient binding strength and high energy being in a trade-off relation with each other. The above negative electrode binders can be used as a mixture.

In one aspect of the present embodiment, an acid and/or an acid anhydride may be added into the negative electrode mixture layer. Examples of the acid especially include compounds having a functional group such as carboxylic acid group, sulfonic acid group, or phosphoric acid group. Examples of the acid anhydride include carboxylic anhydrides, particularly succinic anhydride, tetrafluorosuccinic anhydride, maleic anhydride.

A polymer bearing an acid and/or an acid anhydride may be added to the negative electrode mixture layer. The acidic group such as carboxylic acid group, sulfonic acid group, or phosphoric acid group may be bonded with the polymer acting as a negative electrode binder. Examples of monomer unit with an acidic group include acrylic acids, methacrylic acids and the like. The binder having the acidic group may be obtained by polymerizing them alone or copolymerizing them with another polymerizable monomer.

The content of the acid additive is preferably 2 to 10 parts by mass, more preferably 3 to 6 parts by mass based on 100 parts by mass of the negative electrode active material. By controlling the content of the additive, the concentration of hydroxyl ions in the electrolyte solution can be reduced and the energy density of the negative electrode can be maintained within a required range.

The negative electrode active material may be used in combination with a conductive assisting agent. Specific examples of the conductive assisting agent are the same as those exemplified for the positive electrode.

As the negative electrode current collector, from the viewpoint of electrochemical stability, aluminum, nickel, copper, silver, and alloys thereof are preferred. As the shape thereof, foil, flat plate, mesh and the like are exemplified.

(Electrolyte Solution)

The electrolyte solution of the lithium ion secondary battery according to the present embodiment is not particularly limited, but is preferably a nonaqueous electrolyte solution containing a nonaqueous solvent and a supporting salt that are stable at the operating potential of the battery.

Examples of nonaqueous solvents include aprotic organic solvents, for examples, cyclic carbonates such as propylene carbonate (PC), ethylene carbonate (EC) and butylene carbonate (BC); open-chain carbonates such as dimethyl carbonate (DMC), diethyl carbonate (DEC), ethyl methyl carbonate (EMC) and dipropyl carbonate (DPC); propylene carbonate derivatives; aliphatic carboxylic acid esters such as methyl formate, methyl acetate and ethyl propionate; ethers such as diethyl ether and ethyl propyl ether; phosphoric acid esters such as trimethyl phosphate, triethyl phosphate, tripropyl phosphate, trioctyl phosphate and triphenyl phosphate; and fluorinated aprotic organic solvents obtainable by substituting at least a part of the hydrogen atoms of these compounds with fluorine atom(s), and the like.

Among them, cyclic or open-chain carbonate(s) such as ethylene carbonate (EC), propylene carbonate (PC), butylene carbonate (BC), dimethyl carbonate (DMC), diethyl carbonate (DEC), ethyl methyl carbonate (MEC), dipropyl carbonate (DPC) and the like is preferably contained.

Nonaqueous solvent may be used alone, or in combination of two or more.

The supporting salts include lithium salts, such as $LiPF_6$, $LiAsF_6$, $LiAlCl_4$, $LiClO_4$, $LiBF_4$, $LiSbF_6$, $LiCF_3SO_3$, $LiC_4F_9SO_3$, $LiC(CF_3SO_2)_3$, and $LiN(CF_3SO_2)_2$. Supporting salts may be used alone or in combination of two or more. From the viewpoint of cost reduction, $LiPF_6$ is preferable.

In one aspect of the present embodiment, the electrolyte solution preferably comprises an acid and/or an acid anhydride. Among the acid and the acid anhydride added to the electrolyte solution, the acid anhydride is especially preferred. Acid anhydrides have advantages that it is easily dissolved in the non-aqueous solvent of the electrolytic solution and it does not generate water even when it reacts with the lithium hydroxide. Examples of the acid anhydride include carboxylic anhydrides, disulfonic anhydride, carboxylic-sulfonic anhydride and the like. Examples of the carboxylic anhydride include succinic anhydride, glutaric anhydride or maleic anhydride, phthalic anhydride, pyromellitic anhydride and the like. Examples of the disulfonic anhydride include ethanedisulfonic anhydride, propanedisulfonic anhydride and the like. Examples of the carboxylic-sulfonic anhydride include sulfobenzoic anhydride, sulfopropionic anhydride, sulfobutyric anhydride and the like. These acid anhydrides may have a substituent accordingly. Hydrogens of the acid anhydride may be partially or entirely substituted with halogen such as fluorine or chlorine. The content of the acid anhydride in the solvent is, for example, 0.05 mol/l or more and 5 mol/l or less, preferably 0.1 mol/l or more and 3 mol/l or less.

The electrolyte solution may further contain additives in addition to the acid and acid anhydride additive. Another additive is not particularly limited, and examples thereof include halogenated cyclic carbonates, unsaturated cyclic carbonates, cyclic or open-chain disulfonic acid esters, and the like. The addition of these compounds improves battery characteristics such as cycle characteristics. This is presumably because these additives decompose during charging and discharging of the lithium ion secondary battery to form a film on the surface of the electrode active material and inhibit decomposition of the electrolyte solution and supporting salt.

(Structure of Secondary Battery)

Figure 2:
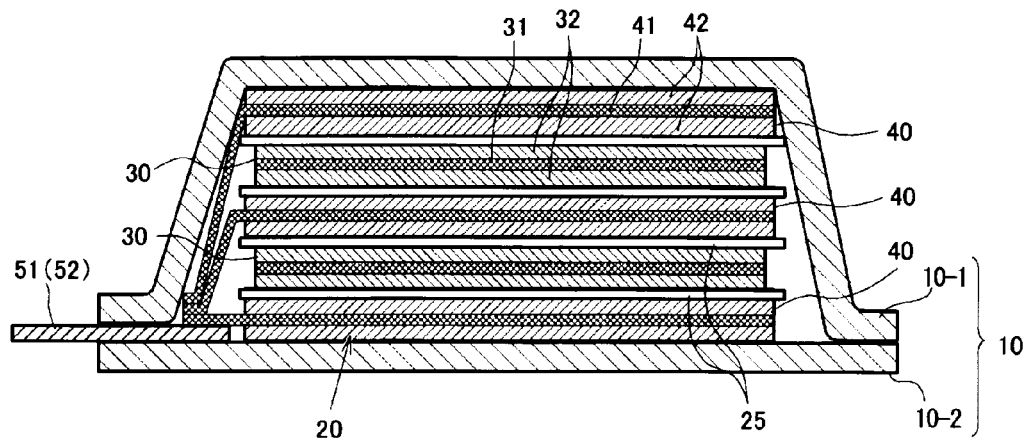
FIG. 2 is a cross-sectional view schematically showing a cross section of the battery of FIG. 1.

The secondary battery according to the present embodiment may be, for example, a secondary battery having a structure as shown in FIGS. 1 and 2. This secondary battery comprises a battery element 20, a film package 10 housing the battery element 20 together with an electrolyte, and a positive electrode tab 51 and a negative electrode tab 52 (hereinafter these are also simply referred to as "electrode tabs").

In the battery element 20, a plurality of positive electrodes 30 and a plurality of negative electrodes 40 are alternately stacked with separators 25 sandwiched therebetween as shown in FIG. 2. In the positive electrode 30, an electrode material 32 is applied to both surfaces of a metal foil 31, and also in the negative electrode 40, an electrode material 42 is applied to both surfaces of a metal foil 41 in the same manner. The present invention is not necessarily limited to stacking type batteries and may also be applied to batteries such as a winding type.

As shown in FIGS. 1 and 2, the secondary battery may have an arrangement in which the electrode tabs are drawn out to one side of the outer package, but the electrode tab may be drawn out to both sides of the outer package. Although detailed illustration is omitted, the metal foils of the positive electrodes and the negative electrodes each have an extended portion in a part of the outer periphery. The extended portions of the negative electrode metal foils are brought together into one and connected to the negative electrode tab 52, and the extended portions of the positive electrode metal foils are brought together into one and connected to the positive electrode tab 51 (see FIG. 2). The portion in which the extended portions are brought together into one in the stacking direction in this manner is also referred to as a "current collecting portion" or the like.

The film package 10 is composed of two films 10-1 and 10-2 in this example. The films 10-1 and 10-2 are heat-sealed to each other in the peripheral portion of the battery element 20 and hermetically sealed. In FIG. 1, the positive electrode tab 51 and the negative electrode tab 52 are drawn out in the same direction from one short side of the film package 10 hermetically sealed in this manner.

Of course, the electrode tabs may be drawn out from different two sides respectively. In addition, regarding the arrangement of the films, in FIG. 1 and FIG. 2, an example in which a cup portion is formed in one film 10-1 and a cup portion is not formed in the other film 10-2 is shown, but other than this, an arrangement in which cup portions are formed in both films (not illustrated), an arrangement in which a cup portion is not formed in either film (not illustrated), and the like may also be adopted.

(Method for Producing Lithium Ion Secondary Battery)

The lithium ion secondary battery according to the present embodiment can be manufactured according to conventional method. An example of a method for manufacturing a lithium ion secondary battery will be described taking a stacked laminate type lithium ion secondary battery as an example. First, in the dry air or an inert atmosphere, the positive electrode and the negative electrode are placed to oppose to each other via a separator to form the above-mentioned electrode element. Next, this electrode element is accommodated in an outer package (container), an electrolyte solution is injected, and the electrode is impregnated with the electrolyte solution. Thereafter, the opening of the outer package is sealed to complete the lithium ion secondary battery.

(Assembled Battery)

A plurality of lithium ion secondary batteries according to the present embodiment may be combined to form an assembled battery. The assembled battery may be configured by connecting two or more lithium ion secondary batteries according to the present embodiment in series or in parallel or in combination of both. The connection in series and/or parallel makes it possible to adjust the capacitance and voltage freely. The number of lithium ion secondary batteries included in the assembled battery can be set appropriately according to the battery capacity and output.

(Vehicle)

The lithium ion secondary battery or the assembled battery according to the present embodiment can be used in vehicles. Vehicles according to an embodiment of the present invention include hybrid vehicles, fuel cell vehicles, electric vehicles (besides four-wheel vehicles (cars, trucks, commercial vehicles such as buses, light automobiles, etc.) two-wheeled vehicle (bike) and tricycle), and the like. The vehicles according to the present embodiment is not limited to automobiles, it may be a variety of power source of other vehicles, such as a moving body like a train.

(Power Storage Equipment)

The lithium ion secondary battery or the assembled battery according to the present embodiment can be used in power storage system. The power storage systems according to the present embodiment include, for example, those which is connected between the commercial power supply and loads of household appliances and used as a backup power source or an auxiliary power in the event of power outage or the like, or those used as a large scale power storage that stabilize power output with large time variation supplied by renewable energy, for example, solar power generation.

EXAMPLE

Example 1

(Manufacture of Positive Electrode)

A layered lithium nickel composite oxide ($LiNi_{0.8}Co_{0.15}Al_{0.05}O_2$), carbon black (trade name: "#3030B", made by Mitsubishi Chemical. Corporation), and polyvinylidene fluoride (trade name: "W #7200" made by Kureha. Corporation) were respectively weighed at a mass ratio of 93:2:5. N-methylpyrrolidone (NMP) was mixed with these to prepare slurry. The mass ratio of NMP and the solid components was 54:46. The slurry was applied on aluminum foil having a thickness of 15 μm using a doctor blade. The slurry coated aluminum foil was heated at 120° C. for 5 minutes to vaporize NMP, to thereby produce a positive electrode.

(Manufacture of Negative Electrode)

Artificial graphite and 1% by mass aqueous solution of carboxymethyl cellulose (CMC) were kneaded using a rotating and revolving mixer (AWATORI RENTARO ARE-500 made by Shinki Corporation), and then styrene-butadiene copolymer (SBR) was added there to prepare negative electrode slurry. The mass ratio of artificial graphite, CMC and SBR was 97:1:2. The slurry was applied on copper foil having a thickness of 10 μm using a doctor blade and subsequently dried at 110° C. for 5 minutes, to thereby produce a negative electrode.

(Assembly of Secondary Battery)

An aluminum terminal and a nickel terminal were welded to each of the produced positive electrode and negative electrode. These were stacked with a separator interposed therebetween to thereby produce an electrode element. The electrode element was packaged with a laminate film and an electrolyte solution was injected inside the laminate film. Subsequently, the laminate film was sealed by heat fusion while reducing the pressure inside the laminate film. A plurality of flat secondary batteries before initial charging was thus produced. A single layer wholly aromatic polyamide (aramid) microporous membrane was used for the separator. The aramid microporous membrane had a thickness of 25 μm and a porosity of 60%. An aluminum-deposited polypropylene film was used for the laminate film. As the electrolyte solution, a solution containing 1.0 mol/l of $LiPF_6$ as an electrolyte, a mixed solvent of ethylene carbonate and diethyl carbonate (7:3 (volume ratio)) as a nonaqueous electrolytic solvent, and succinic anhydride (0.1 mol/l) was used.

(Secondary Battery Storage Test)

The produced battery was charged to 4.2 V and then a storage test was performed by leaving it in a thermostatic bath set at 45° C. for 20 days. The charging was performed in the CCCV mode, and the voltage was maintained constant for an hour after 4.2 V was reached. In addition, after charging at 1 C to 4.2 V by the CCCV mode and discharging at 1 C to 2.5 V by the CC mode were repeated 1000 times, a storage test was performed by leaving it in a thermostatic bath set at 45° C. for 20 days. The 1.0 C current means herein a current that, in the case where any of a fully charged battery is discharged at a constant current, requires 1 hour to allow the battery to be fully discharged. The battery voltage after the storage was measured. A result of 4.0 V or less was determined as self-discharge failure and thereby the failure rate (n/10) of 10 tested batteries was calculated. The results are shown in Table 1.

(Secondary Battery Nail Penetration Test)

The produced battery was charged to 4.2 V and then a nail penetration test was performed. The diameter of the nail was 5 mm and the speed of the nail was 10 mm/s. The maximum temperature after the nail penetration was shown in Table 1.

Example 2

A battery was produced in the same manner as in Example 1 except that the electrolyte solution was changed to a solution comprising 1.0 mol/l of $LiPF_6$ as an electrolyte, a mixed solvent of ethylene carbonate and diethyl carbonate (volume ratio=7:3) as a nonaqueous electrolytic solvent, and tetrafluoro succinic anhydride (0.1 mol/l). The storage test and the nail penetration test of the produced battery were performed. The results are shown in Table 1.

Example 3

A battery was produced in the same manner as in Example 1 except that the electrolyte solution was changed to a solution comprising 1.0 mol/l of $LiPF_6$ as an electrolyte, a mixed solvent of ethylene carbonate and diethyl carbonate (volume ratio=7:3) as a nonaqueous electrolytic solvent, and maleic anhydride (0.1 mol/l). The storage test and the nail penetration test of the produced battery were performed. The results are shown in Table 1.

Comparative Example 1

The separator of Example 1 was changed to a laminated separator in which an aramid microporous membrane was laminated on a polypropylene (PP) microporous membrane. In the laminated separator, the thickness of the PP microporous membrane was 17 μm, the thickness of the aramid microporous membrane was 8 μm, and the porosity of the entire laminated separator was 60%. A battery was produced in the same manner as in Example 1 except for the separator, and then the storage test and the nail penetration test were performed. The results are shown in Table 1.

Comparative Example 2

A battery was produced in the same manner as in Comparative example 1 except that the electrolyte solution was changed to a solution comprising 1.0 mol/l of $LiPF_6$ as an electrolyte, a mixed solvent of ethylene carbonate and diethyl carbonate (volume ratio=7:3) as a nonaqueous electrolytic solvent. The storage test and the nail penetration test of the produced battery were performed. The results are shown in Table 1.

Comparative Example 3

A battery was produced in the same manner as in Example 1 except that the electrolyte solution was changed to a solution comprising 1.0 mol/l of $LiPF_6$ as an electrolyte, a mixed solvent of ethylene carbonate and diethyl carbonate (volume ratio=7:3) as a nonaqueous electrolytic solvent. The storage test and the nail penetration test of the produced battery were performed. The results are shown in Table 1.

TABLE 1

| | Separator | Electrolyte solution additive | Self-discharge failure rate | Maximum temperature |
|---|---|---|---|---|
| Example 1 | Single layer aramid microporous membrane | Succinic anhydride | 0/10 | 30° C. |
| Example 2 | Single layer aramid microporous membrane | Tetrafluoro succinic anhydride | 0/10 | 32° C. |
| Example 3 | Single layer aramid microporous membrane | Maleic anhydride | 0/10 | 32° C. |
| Comparative example 1 | Aramid + PP microporous membrane | Succinic anhydride | 0/10 | 468° C. |
| Comparative example 2 | Aramid + PP microporous membrane | None | 0/10 | 452° C. |
| Comparative example 3 | Single layer aramid microporous membrane | None | 3/10 | 32° C. |

In Examples 1 to 3, a single layered aramid microporous membrane was used as a separator and an acid anhydride was added to the electrolyte solution. In contrast, when an acid anhydride is not added as in Comparative example 3, the self-discharge failure rate is high and it was admitted that the separator was deteriorated after a long period of time. On the other hand, in the case of the separator in which an aramid microporous membrane and a polypropylene microporous membrane are laminated, since polypropylene has high alkali resistance, deterioration of the separator was not confirmed after a long period of time although acid anhydride was not added. However, heat was generated intensely when short-circuit was occurred by nail penetration. It can be confirmed from Examples that the present invention can provide a lithium ion secondary battery having a low self-discharge failure rate after long term storage, even if it is a lithium ion secondary battery comprising a lithium nickel composite oxide as a positive electrode active material and an aramid microporous membrane as a separator.

INDUSTRIAL APPLICABILITY

The battery according to the present invention can be utilized in, for example, all the industrial fields requiring a power supply and the industrial fields pertaining to the transportation, storage and supply of electric energy. Specifically, it can be used in, for example, power supplies for mobile equipment such as cellular phones and notebook personal computers; power supplies for electrically driven vehicles including an electric vehicle, a hybrid vehicle, an electric motorbike and an electric-assisted bike, and moving/transporting media such as trains, satellites and submarines; backup power supplies for UPSs; and electricity storage facilities for storing electric power generated by photovoltaic power generation, wind power generation and the like.

EXPLANATION OF REFERENCE 10 film package
20 battery element
25 separator
30 positive electrode
40 negative electrode

The invention claimed is:

1. A lithium ion secondary battery comprising
a positive electrode comprising a positive electrode active material comprising a lithium nickel composite oxide represented by formula (A), wherein the content of the lithium nickel composite oxide represented by formula (A) in the positive electrode active material is 100 mass %, and the positive electrode further comprises lithium hydroxide, lithium carbonate and/or lithium hydrogen carbonate, and
a separator consisting of one or more layers selected from a polyimide layer, a polyamide layer, and a polyamide imide layer,
wherein the battery comprises an electrolyte solution, wherein the electrolyte solution comprises and acid anhydride in an amount of 0.1 mol/l or more and 3 mol/l or less,

$$Li_yNi_{(1-x)}M_xO_2 \quad (A)$$

wherein $0 \leq x < 0.5$, $0 < y \leq 1.2$, and M is Co and Al.

2. The lithium ion secondary battery according to claim 1, wherein the separator is a microporous membrane or a nonwoven fabric.

3. The lithium ion secondary battery according to claim 2, wherein the separator is an aramid microporous membrane.

4. The lithium ion secondary battery according to claim 3, wherein the separator is a microporous separator consisting of one aramid layer.

5. The lithium ion secondary battery according to claim 1, wherein a packing density of the positive electrode is 3.0 g/cm³ or more.

6. The lithium ion secondary battery according to claim 1, wherein the acid anhydride is selected from the group consisting of succinic anhydride, tetrafluoro succinic anhydride and maleic anhydride.

7. The lithium ion secondary battery according to claim 1, wherein x in the formula (A) is 0.2 or less.

8. The lithium ion secondary battery according to claim 1, wherein the separator consists of an aramid.

9. The lithium ion secondary battery according to claim 8, wherein the separator has a thickness of 25 μm or less.

10. The lithium ion secondary battery according to claim 9, wherein the electrolyte solution comprises $LiPF_6$ and ethylene carbonate and diethyl carbonate.

11. A power storage device having the lithium ion secondary battery according to claim 1.

12. A vehicle mounting the lithium-ion secondary battery according to claim 1.

13. A method of producing a lithium ion secondary battery according to claim 1 having an electrode element, an electrolyte solution and an outer package, comprising:
a step of producing the electrode element by placing a positive electrode comprising a lithium nickel composite oxide and a negative electrode so as to be faced with each other via a separator consisting of one or more layers selected from a polyimide layer, a polyamide layer, and a polyamide imide layer, and
a step of enclosing the electrode element and the electrolyte solution in the outer package, wherein the electrolyte solution comprises an acid and/or an acid anhydride.

* * * * *

UNITED STATES PATENT AND TRADEMARK OFFICE
CERTIFICATE OF CORRECTION

PATENT NO. : 10,833,364 B2
APPLICATION NO. : 15/572568
DATED : November 10, 2020
INVENTOR(S) : Jiro Iriyama, Kenichi Shimura and Kazuhiko Inoue It is certified that error appears in the above-identified patent and that said Letters Patent is hereby corrected as shown below:

In the Claims

Column 16, Line 5; In Claim 1, delete "and" and insert --an-- therefor

Column 16, Line 8; In Claim 1, delete "$Li_yNi_{(i-x)}M_xO_2$" and insert --$Li_yNi_{(1-x)}M_xO_2$-- therefor Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*